(12) United States Patent
Karatsiolis

(10) Patent No.: US 11,997,221 B2
(45) Date of Patent: May 28, 2024

(54) DIGITAL CERTIFICATE AND METHOD FOR SECURELY PROVIDING A PUBLIC KEY

(71) Applicant: MTG AG, Darmstadt (DE)

(72) Inventor: Evangelos Karatsiolis, Darmstadt (DE)

(73) Assignee: MTG AG, Darmstadt (DE)

( * ) Notice: Subject to any disclaimer, the term of this patent is extended or adjusted under 35 U.S.C. 154(b) by 232 days.

(21) Appl. No.: 17/598,553

(22) PCT Filed: Feb. 10, 2020

(86) PCT No.: PCT/EP2020/053357
§ 371 (c)(1),
(2) Date: Sep. 27, 2021

(87) PCT Pub. No.: WO2020/192996
PCT Pub. Date: Oct. 1, 2020

(65) Prior Publication Data
US 2022/0200812 A1    Jun. 23, 2022

(30) Foreign Application Priority Data
Mar. 27, 2019  (DE) .................. 10 2019 107 932.2

(51) Int. Cl.
*H04L 29/06* (2006.01)
*H04L 9/32* (2006.01)

(52) U.S. Cl.
CPC .......... *H04L 9/3268* (2013.01); *H04L 9/3236* (2013.01)

(58) Field of Classification Search
CPC ........................... H04L 9/3236; H04L 9/3268
See application file for complete search history.

(56) References Cited

U.S. PATENT DOCUMENTS

| 10,057,061 | B1* | 8/2018 | Maeng ............... H04L 63/18 |
| 10,848,301 | B1* | 11/2020 | Fregly ............... H04L 61/4511 |
| 2007/0061576 | A1* | 3/2007 | Takada ............... H04L 63/0823 713/175 |
| 2008/0201575 | A1* | 8/2008 | van der Rijn ........... H04L 9/321 713/156 |
| 2009/0198997 | A1* | 8/2009 | Yeap ..................... H04L 51/48 380/282 |

(Continued)

*Primary Examiner* — Rodman Alexander Mahmoudi
(74) *Attorney, Agent, or Firm* — Smartpat PLC

(57) ABSTRACT

Securely transmitting a public key "PK" of a certificate holder within a public key infrastructure includes transferring a digital certificate signed with a digital certificate signature and having certificate holder and certificate key information from a sender "A" to a recipient "B". The recipient "B" establishes a data-transferring connection to a digitally contactable resource "R" on the basis of resource identification information contained in the digital certificate and retrieves the public key "PK" of the certificate holder via the resource "R". The recipient "B" compares a key hash value determined from the public key "PK" using a specified hash function with a certificate key hash value contained in the digital certificate and signed with a digital certificate signature. The public key "PK" assigned to the certificate holder is accepted and used by the recipient "B" if the determined key hash value matches the signed certificate key hash value.

10 Claims, 3 Drawing Sheets

(56) References Cited

U.S. PATENT DOCUMENTS

| | | | |
|---|---|---|---|
| 2011/0179473 A1* | 7/2011 | Lee | H04L 63/105 |
| | | | 726/6 |
| 2012/0204032 A1* | 8/2012 | Wilkins | H04L 9/321 |
| | | | 713/170 |
| 2013/0145154 A1* | 6/2013 | Kim | H04L 9/3263 |
| | | | 713/156 |
| 2014/0354405 A1* | 12/2014 | Kocher | G06F 21/32 |
| | | | 340/5.82 |

* cited by examiner

DIGITAL CERTIFICATE AND METHOD FOR SECURELY PROVIDING A PUBLIC KEY

TECHNICAL FIELD

The disclosure relates to a digital certificate for use in a public key infrastructure, wherein the digital certificate contains digital certificate holder information and certificate key information, and wherein the digital certificate is signed by a certificate authority with a digital certificate signature with which the certificate holder information and at least one piece of certificate key information are signed.

BACKGROUND

A digital certificate is a digital dataset which verifies information about a certificate holder contained in a dataset, wherein the authenticity of the digital certificate can be verified by suitable methods. A digital certificate is conventionally issued and verified by a trusted certificate authority, wherein the certificate authority signs the digital certificate with a digital certificate signature. The certificate signature of the digital certificate can be verified at a later date by the certificate authority or by a suitable validator in order to determine whether the digital certificate has been modified after certification by the trusted certificate authority. Digital certificates can be used, for example, for communication between two computers, wherein communication is generally carried out only if the authenticity of the digital certificate can be established.

Digital certificates can be used within a public key infrastructure to transmit a public key of the certificate holder. For this purpose, the digital certificate contains certificate holder information and certificate key information. Various standards for digital certificates which can be used for secure data transfer between different participants within a public key infrastructure are known at present. A known example of a standardized certificate is an X.509 certificate. In addition to the certificate holder information, the X.509 certificate contains inter alia certificate key information, which includes a public key of the certificate holder and associated key property information. As soon as a recipient of the X.509 certificate has verified its authenticity, the recipient can use the public key of the certificate holder contained in this X.509 certificate in order to be able to sign or encrypt, for example, a subsequent data transfer or communication between the sender of the digital certificate and the recipient. On the basis of the key property information, the recipient can quickly determine the encryption method for which the public key contained in the X.509 certificate is suitable and can be used.

In the same way, a public key of the recipient can also be transmitted back to the sender. The sender and the recipient can then carry out secure communication and data transfer using the public keys which they have exchanged with one another.

In view of increasingly important protection of a communication between the sender and the recipient, increasingly more complex encryption methods are being developed, the encryption of which is as difficult as possible for unauthorized third parties to decrypt. It has been shown that, in many cases, a key that is as long as possible and in some cases is many kilobytes or even more than a megabyte long permits or facilitates a particularly well protected encryption method and makes unauthorized decryption considerably more difficult.

Multiple digital certificates may have to be transmitted from the sender to the recipient before the digital certificate in question contains a public key for an encryption method that the recipient is able to carry out, since not every recipient is normally familiar with or able to apply every available encryption method. However, the exchange of long keys within a digital certificate, the amount of data of which thus becomes correspondingly larger, prevents a rapid exchange of these digital certificates and thus the rapid establishment of secure communication between a sender and a recipient.

SUMMARY

It is therefore considered to be an object of the present disclosure to configure a digital certificate in such a manner that exchange of the digital certificate as quickly as possible is facilitated when the public key to be transmitted to the recipient has a long key length and a correspondingly large amount of data.

This object is achieved in that the digital certificate contains at least one piece of resource identification information relating to a first digitally contactable resource via which at least one public key can be retrieved, in that the digital certificate comprises a certificate key hash value which is assigned to the at least one public key retrievable via the at least one resource, and in that the digital certificate signature also signs the at least one certificate key hash value. The actual transmission of the public key within the digital certificate is not absolutely essential with regard to the secure transmission of the public key. Instead, it is sufficient that a certificate key hash value generated from the public key using a suitable hash function is contained in the digital certificate and is signed together with the certificate holder information. By means of the digital certificate signature generated by the trusted certificate authority on certification, the certificate key hash value, which is uniquely assigned to the public key in question, is linked in a verifiable manner with the certificate holder. The public key can be retrieved, if required, via the resource specified by the resource identification information. By comparing a key hash value determined by the recipient on the basis of the retrieved public key with the certificate key hash value contained in the digital certificate and signed, the recipient is able to verify and establish that the public key retrieved from the resource is actually assigned to the certificate holder and also has not been manipulated in the meantime.

The amount of data required for the digital certificate according to the disclosure can be comparatively small. The resource identification information can be, for example, a standardized uniform resource identifier (URI). A frequently used example of a uniform resource identifier is a uniform resource locator (URL), with which a resource is localized and, moreover, identified via the access method to be used. Known network protocols for data transfer between participants of a digital network, such as, for example, the HTTP protocol or the FTP protocol, use standardized uniform resource locators. With such resource identification information, a public key stored with the resource in question can be accessed and the public key in question can be retrieved from the resource and transferred to a participant of the network.

The resource can be, for example, a storage facility provided by the certificate holder and connected to a digital network. The resource can likewise be a storage facility provided by the trusted certificate authority or by a third party. Furthermore, it is also possible, and expedient for various applications, that the resource is a storage facility held ready by the recipient of the digital certificate, in which the certificate holder has stored his public key beforehand. The resource is digitally contactable within the meaning of the present disclosure if a computer device, using a known and optionally standardized method, is able to establish a data-transferring connection with the resource and retrieve, or transfer to the computer device, a public key stored in the resource.

The amount of data of the digital certificate, in particular when using a public key which has a key length of several kilobytes or even megabytes, is considerably smaller than the amount of data required for the public key. The digital certificate according to the disclosure can therefore be transmitted substantially more quickly from a sender to a recipient and verified there. In many cases, the digital certificate must be transmitted to a validator for verification, which gives rise to a further outlay in terms of transmission, which, in the case of a digital certificate that is as small as possible, is again less than in the case of a digital certificate with a large amount of data. As soon as it is certain that the digital certificate has successfully been verified and the recipient is able to use the public key, the certificate key hash value of which is contained in the digital certificate, for a corresponding encryption method in a subsequent communication, the recipient can retrieve and obtain the public key from the resource identified via the resource identification information. However, if the digital certificate is to be discarded or the public key made available with this digital certificate cannot be used by the recipient, only a substantially smaller amount of data, compared to the public key, had to be transmitted from the sender to the recipient and optionally additionally to a validator before the digital certificate is discarded and optionally replaced by another digital certificate, which, however, must then again be transferred from the sender to the recipient.

According to a particularly advantageous form of the inventive idea, it is provided that the digital certificate contains multiple certificate hash values, each of which is assigned to a public key which is retrievable via the at least one resource. In this manner, it is possible that one digital certificate can refer to multiple public keys which, according to the respective specifications of the sender or of the recipient, can selectively be used for subsequent use and, for example, for communication between the sender and the recipient. The exchange of a single digital certificate thus allows the recipient to be provided with multiple public keys without a separate certificate having to be transmitted and supplied to the recipient for each key. The outlay for verifying the authenticity of the digital certificate and for selecting a suitable public key for subsequent use in a data transfer between the sender and the recipient can thereby be reduced considerably.

Since, in the case of the digital certificate according to the disclosure, it is necessary to transmit in each case not the complete public key but only the respective certificate key hash values and at least one piece of resource identification information, multiple public keys containing large amounts of data can be supplied and reliably exchanged between the sender and the recipient using a comparatively small digital certificate containing only a small amount of data.

According to one form of the inventive idea, it is provided that the pieces of certificate key information for the multiple public keys each contain at least one associated piece of key property information. The key property information can contain, for example, information about the associated encryption method or further parameters for the use of the public key in question which are either necessary or optional. The key property information can be used by the recipient, for example, to identify the respective encryption method and thereafter to decide whether the encryption method in question is suitable for the recipient and the public key in question should be retrieved from the resource. Such a digital certificate can accordingly also be used in a public key infrastructure, in which the respective participants can use different encryption methods and it does not have to be established beforehand which encryption method is to be used for a data exchange between the respective sender and recipient.

It is likewise possible with the digital certificate according to the disclosure to make a gradual change between an outdated encryption method and a new encryption method which is rated as better, without thereby increasing the number of digital certificates required before a secure and encrypted data exchange, which digital certificates must be transmitted from the sender to the recipient beforehand. The digital certificate must merely contain the relevant key hash values for the old and for the new encryption method and the at least one piece of resource identification information, via which the relevant public keys can be retrieved.

It is optionally provided that the digital certificate contains multiple pieces of resource identification information each relating to different digitally contactable resources via each of which at least one public key can be retrieved. Thus, for example, for each public key for which certificate key information is contained in the digital certificate, an associated piece of resource identification information can be stored. The different public keys can be stored, for example, in different storage facilities specified by the sender. It is likewise possible that individual or all the public keys are stored in a directory service in which a large number of public keys are stored.

It is likewise conceivable that multiple different pieces of resource identification information are stored for a single public key. Should it not be possible to retrieve the public key via the resource associated with a first piece of resource identification information, for example because the storage facility in question is temporarily unreachable or permanently inoperative, the selected public key can be retrieved from a second resource, which is identified and accessible via the second piece of resource identification information. In this manner, the transmission of the public key from the sender to the recipient with the aid of a single digital certificate is particularly reliable and failure-resistant.

In order to increase the security of the exchange of the public key between the sender and the recipient, it can optionally be provided that the digital certificate signature also signs the at least one piece of resource identification information. In this manner it can be ensured that manipulation of the resource identification information by unauthorized third parties can also be made more difficult or prevented. It can be ensured with the signed resource identification information not only that the public key retrievable via the resource actually corresponds to the relevant public key of the certificate holder, but also that the relevant public key is retrieved from the resource that was specified by the certificate holder.

With regard to the gradual introduction of new encryption methods with complex public keys containing large amounts of data, it is provided according to an advantageous form of the inventive idea that the certificate key information also contains a public key of the certificate holder. The digital certificate according to the disclosure can thus contain, for example, a first public key for a first encryption method which is currently frequently used and therefore accepted by many participants of the public key infrastructure. Such a public key can have a key length of, for example, 256 bits or 1024 bits. As long as the recipient is able to use only this first encryption method, the relevant first public key is already contained in the digital certificate and does not have to be retrieved separately from an external resource. However, if the recipient is already able to use a newly developed second encryption method and therefore requires a second public key suitable therefor, the key length of which is, for example, substantially longer, the recipient can retrieve the second public key via the resource identification information already contained in the digital certificate and use it for improved encryption with the second encryption method.

The X.509 certificate which is currently frequently used contains, in addition to a public key, the possibility of storing additional information in the digital certificate within an extension already provided in the standard. It is not impossible that this information contains, for example, a certificate key hash value according to the disclosure and resource identification information. The digital certificate according to the disclosure can therefore be used within a public key infrastructure such as an X.509 certificate and exchanged between a sender and a recipient, without the introduction of a new standard being necessary beforehand.

The disclosure relates also to a method for securely transmitting a public key of a certificate holder within a public key infrastructure, wherein a digital certificate containing certificate holder information and certificate key information and signed with a digital certificate signature is transferred from a sender to a recipient, and wherein the recipient, on the basis of the transmitted digital certificate, obtains access to a public key of the certificate holder.

In many conventional digital certificates, the certificate key information contains only a single public key and additional key property information, such as, for example, information about the relevant encryption method and about further parameters which are necessary or helpful for the use of the public key with the encryption method provided therefor. If the recipient is unable to use and employ the encryption method for which the public key in the digital certificate is provided, the digital certificate transmitted to the recipient cannot be used further. The sender must transmit a further digital certificate with another public key to the recipient, so that the recipient, where possible, can carry out the desired data exchange using the second public key and the associated encryption method. In particular when transmitting public keys which contain a large amount of data, the outlay for transmitting a correspondingly large digital certificate is considerable and, in particular in the case where the public key in question cannot be used by the recipient, can lead to a considerable delay in establishing secure communication between the sender and the recipient.

It is therefore seen as a further object of the present disclosure to configure a method for securely transmitting a public key of a certificate holder from a sender to a recipient in such a manner that the outlay for transmitting a public key suitable for the subsequent communication is as low as possible, even in the case of public keys with a large amount of data, and the rapid establishment of secure communication is facilitated.

This object is achieved according to the disclosure in that, in a key retrieval step, the recipient establishes a data-transferring connection to a digitally contactable resource on the basis of resource identification information contained in the digital certificate and retrieves the public key of the certificate holder via the resource, and in that, in a verification step, a key hash value determined by the recipient from the public key using a specified hash function is compared with a certificate key hash value contained in the digital certificate and signed with a digital certificate signature, wherein the public key assigned to the certificate holder is accepted and used by the recipient if the determined key hash value matches the signed certificate key hash value. Before the recipient retrieves the public key from the resource, the recipient, in a certificate verification step carried out beforehand, can verify the authenticity of the certificate or have it verified by a validator, for example, and discard a possibly invalid digital certificate, without the large amount of data of a public key having to be transferred from the sender to the recipient.

The resource identification information can, for example, also refer to a resource from which the recipient can retrieve the public key substantially more quickly than would be allowed by the transmission of the digital certificate from the sender to the recipient via a possibly slow connection of the sender to the public key infrastructure. The time required for the exchange of the public key can also be reduced thereby. By comparing the signed certificate key hash value contained in the digital certificate with the key hash value determined by the recipient for the public key retrieved from the resource, it can be verified and ensured that the public key in question is the public key of the certificate holder.

According to a particularly preferred form of the method according to the disclosure, it is provided that, in a key identification step preceding the key retrieval step, the recipient checks, in a specifiable order, for multiple different encryption methods, whether the certificate key information of the digital certificate contains key property information for a specified encryption method, and that, in the following key retrieval step, in the case where the certificate key information contains certificate key information for a verified encryption method, the associated public key is retrieved via the resource associated with the key property information. The digital certificate transmitted from the sender to the recipient can in this manner be used to simultaneously offer to the recipient multiple public keys and accordingly different encryption methods which are possible and can be offered on the part of the sender for subsequent communication and a secure data exchange between the sender and the recipient. Consequently, it is not necessary, in the case where an encryption method is rejected by the recipient, to transmit a further digital certificate again from the sender to the recipient, which must then also be verified again by the recipient or by an external validator.

Moreover, it is possible with the method configured according to the disclosure to make a gradual change from a currently established encryption method with corresponding public keys to a new encryption method, without having to expect an increased number of transmissions of a digital certificate, at least at the start of the changeover, as a result of the new encryption method then frequently still being rejected by the recipient. Moreover, public keys with a large amount of data of several kilobytes or megabytes can also be offered by the sender with the method according to the disclosure, without the amount of data exchanged via public certificates in the public key infrastructure between the participants increasing as a result.

According to an optional form of the inventive idea, it is provided that, in a resource identification step, in a specifiable order, for multiple pieces of resource identification information associated with a single piece of key property information, a data-transferring connection to a digitally contactable resource identified by the resource identification information is established, in order subsequently, in the key retrieval step, to retrieve the public key of the certificate holder via the relevant resource. Should the data transfer of the public key from the first selected resource not be possible, or if the data transfer rate is lower than a specified minimum data transfer rate, the recipient can turn to the next resource and initiate the retrieval of the public key from the resource in question. The reliability and the failure safety in the exchange of public keys is thus improved considerably. Moreover, the time required for the exchange of the public key can in many cases, and in particular in the case of public keys with a large amount of data, be reduced significantly.

According to one form of the inventive idea, it is optionally provided that, in the key retrieval step, it is first checked whether a public key of the certificate holder can be retrieved via the resource, and that the key retrieval step is terminated if a public key cannot be retrieved via the resource. The sender can thus include in the digital certificate, for example, certificate key information for a number of encryption methods and corresponding public keys. If the sender in future no longer intends to authorize or use an individual encryption method or an individual public key, the sender can delete the corresponding public key from the associated resource and thus prevent the public key in question or the encryption method assigned to that public key from being used by a recipient. If the digital certificate of the sender contains certificate key information for multiple public keys, the recipient can carry out a key retrieval step for another public key which has been identified in a preceding key identification step. Likewise, the recipient can optionally carry out a key retrieval step for another resource identified in a resource identification step, if the public key in question is to be used in principle but the first identified resource cannot be digitally contacted, for example for technical reasons, or is not available for the retrieval of the public key. No further data exchange between the sender and the recipient is necessary for these alternatives in the retrieval of a public key, so that communication between the sender and the recipient is simplified and accelerated. Moreover, the required load on the network for the data exchange of a public key is reduced.

With regard to a further acceleration of the method according to the disclosure and to a further reduced data exchange for the transmission of the public key to the recipient, it is provided according to an advantageous form of the inventive idea that the recipient stores a public key of the certificate holder retrieved via the resource in a storage facility of the recipient and, before the key retrieval step is carried out again at a later date, checks whether the public key assigned to a digital certificate of the sender is already stored in the storage facility of the recipient, and that the recipient optionally uses the public key stored in the storage facility for the subsequent verification step. The recipient can store an associated public key for different senders. The recipient can optionally also retrieve multiple public keys communicated to the recipient for an individual sender and store them in the storage facility of the recipient. In a subsequent new exchange of a digital certificate from an already known sender to the recipient, the recipient can check beforehand whether the recipient already has a public key for this sender which matches the newly transmitted digital certificate.

If the recipient has identified an already existing and matching public key of the sender, the recipient can dispense with retrieving the relevant public key again from the resource identified by the resource identification information in the newly transmitted digital certificate and instead can use the public key of the sender that is already stored in the storage facility of the recipient. In particular in the case of a public key which contains a large amount of data, the preliminary communication between a sender and a recipient can thus be considerably reduced and accelerated, before the recipient can then use the public key of the sender.

With the method according to the disclosure, all the options described hereinbefore in connection with the digital certificate can further be used and integrated as optional method steps. This concerns in particular the possibility of including different pieces of certificate key information, possibly key property information and the resource identification information in the digital certificate signature, in order also to make the authenticity of this further information verifiable and to rule out manipulation of this further information where possible. The inclusion of this additional information in the digital certificate signature may in individual cases be associated with a slightly higher outlay in terms of the signing or issuing of the certificate signature by the certificate authority, but in practice this does not play an appreciable role. In the verification of the digital certificate signature by the recipient or by an external validator, on the other hand, there is generally no additional outlay despite the improved protection against undesirable manipulation of the digital certificate and the information contained therein.

Different forms of the inventive idea, which are illustrated by way of example and schematically in the drawing, will be explained in greater detail hereinbelow.

DETAILED DESCRIPTION

Figure 1:
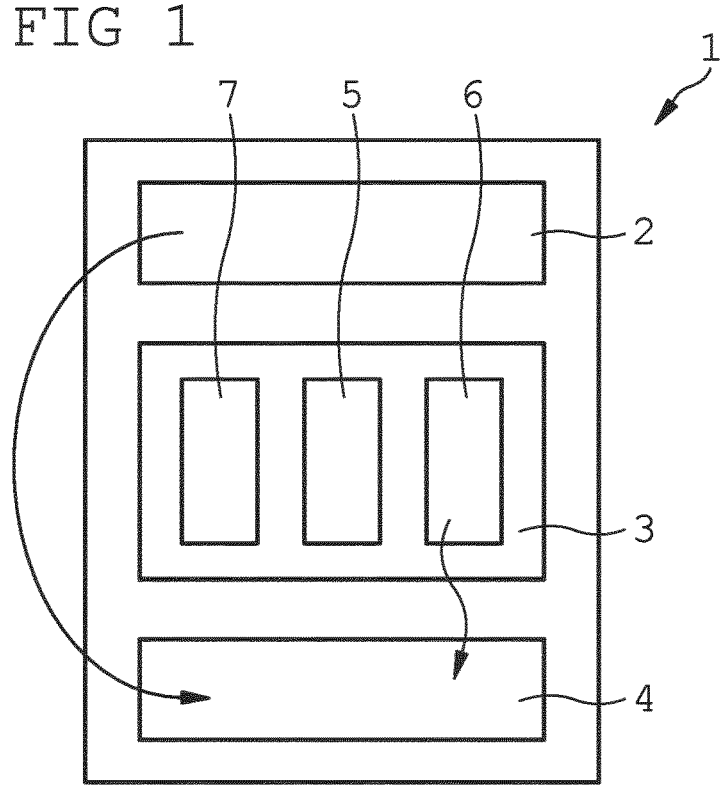
FIG. 1 shows a schematic illustration of a digital certificate configured according to the disclosure.

A digital certificate 1 configured according to the disclosure and illustrated in FIG. 1 contains certificate holder information 2 and certificate key information 3. The digital certificate 1 has been provided with a digital certificate signature 4 by a trusted certificate authority, which signature has been determined in accordance with a specified signature method on the basis of information contained in the digital certificate 1. The digital certificate signature 4 can be verified by a recipient of the digital certificate 1 in order to be able to ascertain the authenticity of the digital certificate 1 and of the information of the certificate holder contained therein.

The certificate holder information 2 can in the conventional manner contain information for identifying the certificate holder, for example a personal name or a company name or an email address, or a unique device address, such as, for example, a MAC address, or the identification of a service which is to be used for data exchange between participants of a public key infrastructure. In a departure from standardized digital certificates which are currently used, the certificate key information 3 does not contain a public key of a certificate holder identified via the certificate holder information 2. The certificate key information 3 contains resource identification information 5 and a certificate key hash value 6. The resource identification information 5 can be, for example, a standardized uniform resource identifier (URI) or a uniform resource locator (URL) with which a digitally contactable resource is uniquely identified, so that the recipient of the digital certificate 1 can retrieve a public key of the certificate holder, which is not contained in the digital certificate 1, via the relevant resource and transfer it to the recipient.

The certificate key hash value 6 is a hash value which has been determined beforehand, on the basis of the public key which is retrievable via the resource, using a specified hash function. A hash function conventionally maps a large amount of data in a manner specified by the hash function onto a generally substantially shorter hash value. A hash function which is particularly suitable for the encryption of data makes it difficult for an unauthorized third party to be able to allocate different original data to the same hash value or to purposively find such different original data with the same hash value, in order to be able to prevent undesirable manipulation of the original data, so that the authenticity of the original data signed with the hash value can reliably be verified.

In addition, the certificate key information 3 can also contain key property information 7. The key property information 7 includes, for example, information about the associated encryption method for which the public key is intended, or individual parameters which are necessary or optional for carrying out the encryption method, or, for example, information about the validity or about the period of validity of the public key, so that, in addition to validating the digital certificate 1, it is also possible to check the validity of the corresponding public key on the basis of the information contained in the digital certificate 1.

The digital certificate signature 4 is determined on the basis of the certificate holder information 2 and the certificate key hash value 6 and stored in the digital certificate 1. By verifying the digital certificate signature 4, it is thus also possible to verify the authenticity of the certificate holder and the authenticity of the public key which can be retrieved via the resource and for which the hash function must yield the same key hash value as is stored in the digital certificate 1 as the certificate key hash value and has become part of the digital certificate signature 4.

Figure 2:
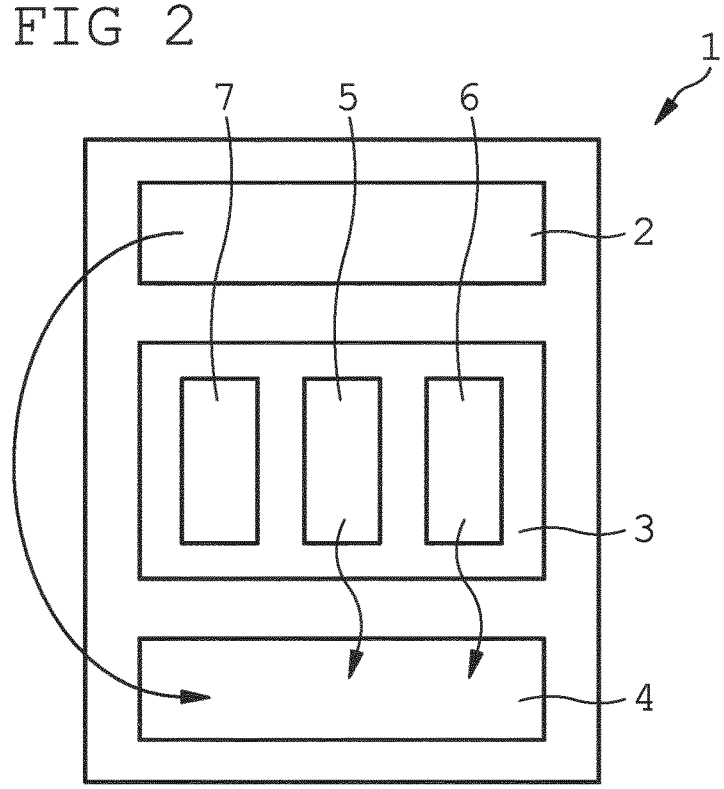
FIG. 2 shows a schematic illustration of a digital certificate which is configured differently to FIG. 1 and likewise in accordance with the disclosure.

FIG. 2 shows an exemplary embodiment of a digital certificate 1 according to the disclosure which is configured differently. In order to prevent undesirable manipulation of the resource identification information, it can be provided that the digital certificate signature 4 is not only determined on the basis of the certificate holder information 2 and the certificate key hash value 6, but additionally takes account of the resource identification information 5, and this resource identification information 5 is used as further original data on the basis of which computation of the digital certificate signature 4 is carried out. Subsequent manipulation of the resource identification information 5 stored in the digital certificate 1 is thus effectively ruled out. Following successful verification of the digital certificate signature 4, the recipient can be confident that the public key is retrieved from the resource that the certificate holder has selected and specified via the resource identification information 5.

Figure 3:
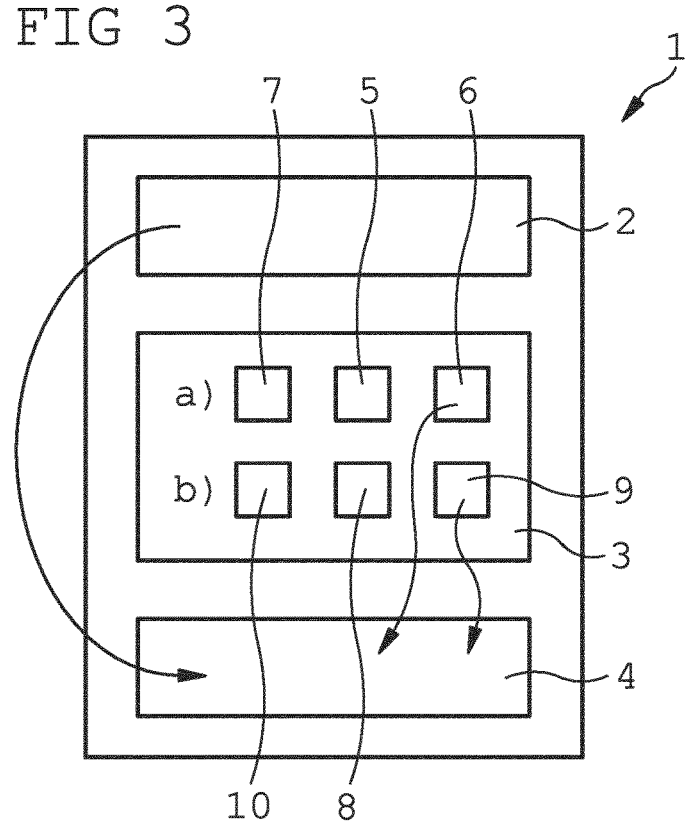
FIG. 3 shows a schematic illustration of a digital certificate according to the disclosure which again is configured differently.

In the exemplary embodiment illustrated schematically in FIG. 3, the certificate key information 3 contains a piece of resource identification information 5, 8, a certificate key hash value 6, 9 and key property information 7, 10 for each of two different public keys of the certificate holder. The two different keys, or the respective associated information within the digital certificate 1, are indicated by the reference signs a) and b). The recipient of this digital certificate 1 can check, in an order specified by the recipient, on the basis of, for example, the respective key property information 7, 10, whether a public key of the certificate holder that is appropriate for an encryption method desired by the recipient is available and can be retrieved via the relevant resource. As soon as a suitable public key has been identified by the recipient, the recipient can retrieve the relevant public key via the resource identified via the associated resource identification information 5, 8 and transmit it to the recipient.

Figure 4:
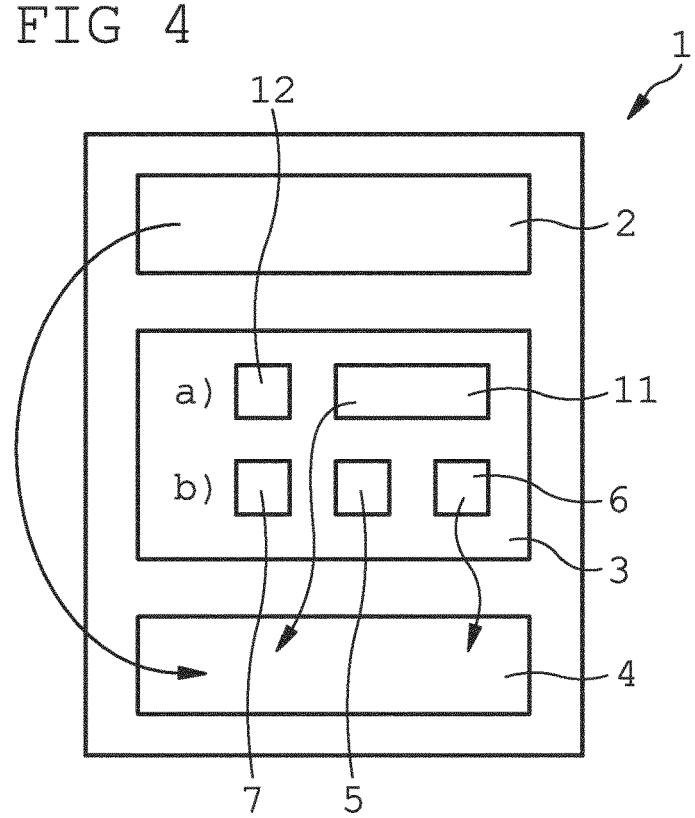
FIG. 4 shows a schematic illustration of a digital certificate according to the disclosure which is again configured differently.

With regard to a gradual change from currently used encryption methods and digital certificates, in which a public key of the certificate holder is stored and contained in the digital certificate, to improved encryption methods which will be used in future, it can be advantageous if a digital certificate 1 according to the disclosure adapted thereto additionally also contains a further public key, which is transmitted from the sender to the recipient together with the digital certificate 1. A corresponding configuration of a digital certificate 1 according to the disclosure is illustrated schematically in FIG. 4. While for a first public key the associated certificate key information a) contains the public key 11 and corresponding key property information 12, the certificate key information b) for a second public key contains only its resource identification information 5, the certificate key hash value 6 and corresponding key property information 7 for the public key, which can be retrieved, if required, via the resource identified by the resource identification information 5.

Figure 5:
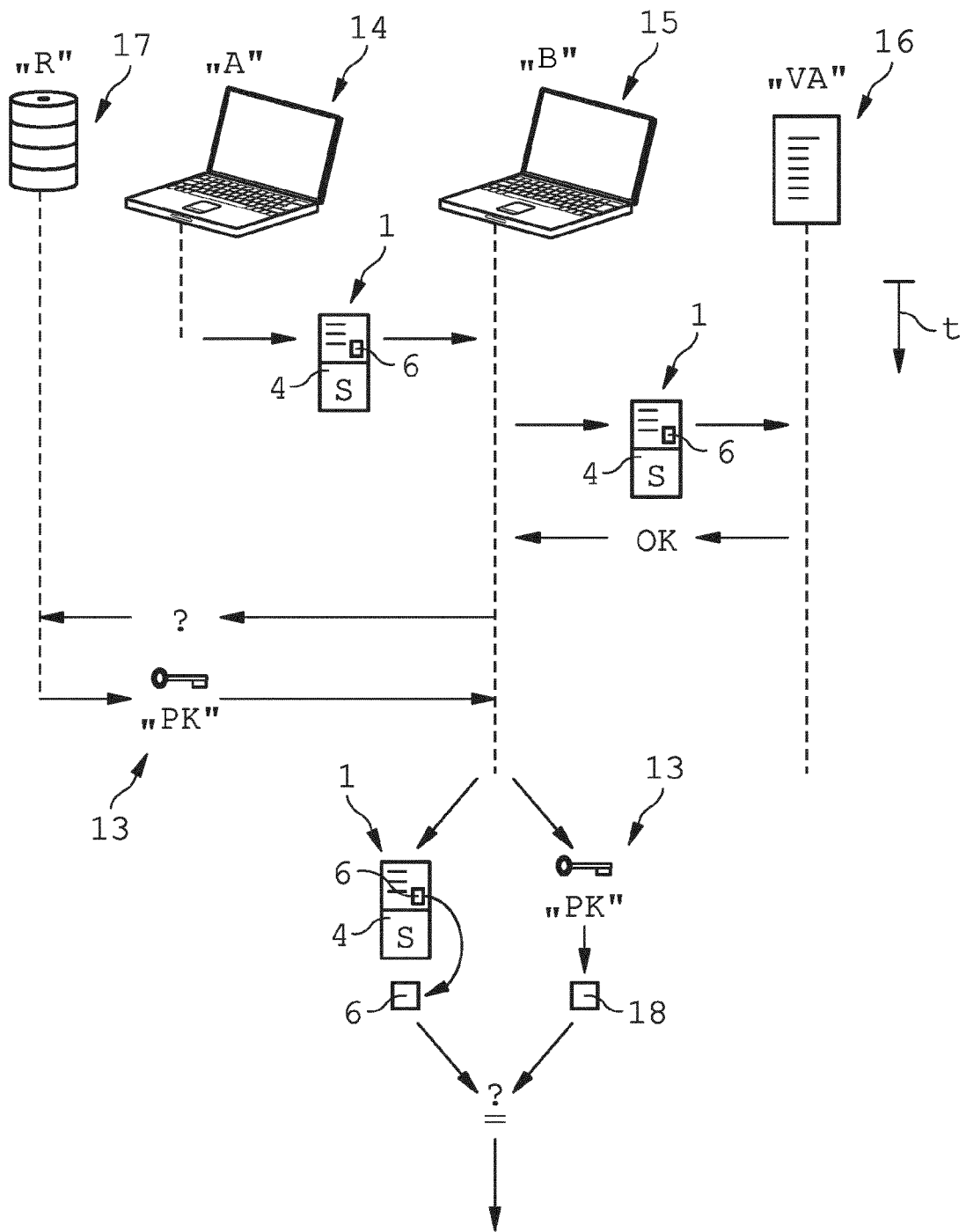
FIG. 5 shows a schematic illustration of a method sequence according to the disclosure for transmitting a public key of a certificate holder within a public key infrastructure using a digital certificate configured according to the disclosure.

In a method sequence according to the disclosure illustrated schematically in FIG. 5 for securely transmitting a public key "PK" 13 of a certificate holder within a public key infrastructure, a digital certificate 1 signed with a digital certificate signature "S" 4 is first transmitted from a sender "A" 14 to a recipient "B" 15. The digital certificate 1 contains, in addition to the certificate holder information, also the certificate key hash value 6 and the resource identification information 5 and key property information 7, not shown separately in FIG. 5, as are shown and contained in the schematic illustrations in FIGS. 1 to 4 of exemplary configurations of such a digital certificate 1.

In a signature verification step, the recipient "B" 15 transmits the digital certificate 1 for verification to an external validator "VA" 16 which, after a successful verification, confirms the authenticity of the digital certificate 1.

In a key retrieval step, the recipient "B" 15 then contacts a resource "R" 17 identified via the resource identification information 5 contained in the digital certificate 1 and retrieves from the resource "R" 17 the public key "PK" 13 of the certificate holder, a copy of which is then transferred from the resource "R" 17 to the recipient "B" 15. The recipient "B" 15 is then in possession of the public key "PK" 13 of the certificate holder.

In a subsequent key verification step, the recipient "B" 15 computes a key hash value 18 with the aid of a specified hash function and compares this computed key hash value 18 with the certificate key hash value 6 in the digital certificate 1. If the computed key hash value 18 matches the certificate key hash value 6 transmitted by the sender in the digital certificate 1, the authenticity of the public key "PK" 13 of the certificate holder is confirmed, otherwise this public key "PK" 13 is discarded and not used for a subsequent data exchange, which is no longer illustrated in FIG. 5, for example as part of a communication between the sender "A" 14 and the recipient "B" 15.

In the method according to the disclosure, the method steps already described hereinbefore and not illustrated separately, for example a key identification step or a resource identification step, can optionally also be carried out.

The invention claimed is:

1. A digital certificate (1) for use in a public key infrastructure,
    wherein the digital certificate (1) contains certificate holder information (2) and certificate key information (3), and
    wherein the digital certificate (1) is signed by a certificate authority with a digital certificate signature (4) with which the certificate holder information (2) and the certificate key information (3) are signed,
    wherein the digital certificate (1) comprises at least one piece of resource identification information (5) relating to a first digitally contactable resource (17) via which at least one public key (13) can be retrieved,
    wherein the digital certificate (1) comprises a certificate key hash value (6) which is assigned to the at least one public key (13) retrievable via the at least one resource (17), and
    wherein the digital certificate signature (4) also signs the certificate key hash value (6).

2. The digital certificate (1) according to claim 1,
    wherein the at least one public key (13) comprises multiple public keys which are retrievable via the at least one resource (17),
    wherein the digital certificate (1) comprises multiple certificate key hash values (6), each of which is assigned to one of the multiple public keys which are retrievable via the at least one resource (17).

3. The digital certificate (1) according to claim 2,
    wherein the certificate key information (3) comprises multiple pieces of certificate key information (3) for the multiple public keys (13), each containing at least one associated piece of key property information (7, 10, 12).

4. The digital certificate (1) according to claim 1,
    wherein the digital certificate (1) comprises multiple pieces of resource identification information (5, 8) each relating to different digitally contactable resources (17) via each of which at least one public key (13) can be retrieved.

5. The digital certificate (1) according to claim 1,
    wherein the digital certificate signature (4) also signs the at least one piece of resource identification information (5, 8).

6. The digital certificate (1) according to claim 1,
    wherein the certificate key information (3) also contains a public key (11) of the certificate holder.

7. A method for securely transmitting a public key (13) of a certificate holder within a public key infrastructure,
    wherein a digital certificate (1) signed with a digital certificate signature (4) and having certificate holder information (2) and certificate key information (3) is transferred from a sender (14) to a recipient (15), and
    wherein the recipient (15), based on the transmitted digital certificate (1), obtains access to a public key (13) of the certificate holder,
    wherein, in a key retrieval step, the recipient (15) establishes a data-transferring connection to a digitally contactable resource (17) based on resource identification information (5, 8) contained in the digital certificate and retrieves the public key (13) of the certificate holder via the resource (17), and
    wherein, in a verification step, a key hash value (18) determined by the recipient (15) from the public key (13) using a specified hash function is compared with a certificate key hash value (6) contained in the digital certificate (1) and signed with a digital certificate signature (4) and the public key (13) assigned to the certificate holder is accepted and used by the recipient (15) if the determined key hash value (18) matches the signed certificate key hash value (6).

8. The method according to claim 7,
    wherein, in a key identification step preceding the key retrieval step, the recipient (15) checks, in a specifiable order, for multiple different encryption methods, whether the certificate key information (3) of the digital certificate (1) contains key property information (7, 10, 12) for a specified encryption method, and
    wherein, in the following key retrieval step, in the case where the certificate key information (3) contains key property information (7, 10, 12) for a verified encryption method, the associated public key (13) is retrieved via the resource (17) associated with the key property information (7, 10, 12).

9. The method according to claim 7,
    wherein, in a resource identification step, in a specified order, for multiple pieces of resource identification information (5, 8) associated with a piece of key property information (7, 10), a data-transferring connection to a digitally contactable resource (17) identified by the resource identification information (5, 8) is established, in order subsequently, in the key retrieval step, to retrieve the public key (13) of the certificate holder via the relevant resource (17).

10. The method according to claim 7,
    wherein, in the key retrieval step, it is first checked whether a public key (13) of the certificate holder can be retrieved via the resourced (17),
    wherein the key retrieval step is terminated if a public key (13) cannot be retrieved via the resource (17), and
    wherein a key retrieval step is optionally carried out for another public key identified in a preceding key identification step, or
    wherein a key retrieval step is optionally carried out for another resource identified in a resource identification step.

* * * * *